US006213034B1

(12) United States Patent
Raducha et al.

(10) Patent No.: US 6,213,034 B1
(45) Date of Patent: Apr. 10, 2001

(54) PLANTER APPARATUS AND METHOD

(75) Inventors: Kregg J. Raducha, Chicago; Paul M. Paluch, Westmont, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/141,676

(22) Filed: Aug. 27, 1998

(51) Int. Cl.⁷ ........................................ A01C 5/00
(52) U.S. Cl. .................. 111/57; 111/55; 111/59; 111/66; 172/776; 172/452
(58) Field of Search .................. 111/54, 55, 56, 111/57, 59, 62, 66, 200; 172/311, 456, 457, 776, 781, 810, 811, 452

(56) References Cited

U.S. PATENT DOCUMENTS

| 19,859 | * | 4/1858 | Lutz ........................................ 111/58 |
| 840,020 | * | 1/1907 | Schutt ..................................... 111/58 |
| 2,352,479 | | 6/1944 | Huddle .................................... 56/228 |
| 2,966,219 | | 12/1960 | French ................................... 172/289 |
| 3,356,301 | | 12/1967 | Barber et al. ........................ 239/664 |
| 3,767,231 | | 10/1973 | Grosse-Rhode ..................... 280/482 |
| 3,841,413 | | 10/1974 | Applewhite ......................... 172/311 |
| 3,919,831 | | 11/1975 | Halls et al. ............................. 56/228 |
| 3,965,989 | | 6/1976 | Ward .................................... 172/310 |
| 4,008,833 | | 2/1977 | Gandrud et al. .................... 222/626 |
| 4,117,893 | | 10/1978 | Kinzenbaw .......................... 172/311 |
| 4,137,852 | | 2/1979 | Pratt .................................... 111/57 |
| 4,241,674 | * | 12/1980 | Mellinger ............................ 111/52 |
| 4,272,097 | | 6/1981 | Cornelius ............................. 172/311 |
| 4,301,873 | | 11/1981 | Baxter ................................. 172/311 |
| 4,319,643 | | 3/1982 | Carter et al. ........................ 172/311 |
| 4,327,932 | | 5/1982 | Anderson ............................ 172/311 |
| 4,460,193 | | 7/1984 | Dietz et al. ............................. 56/228 |
| 4,506,904 | | 3/1985 | Kinzenbaw .......................... 172/248 |
| 4,518,046 | | 5/1985 | Rettig et al. ......................... 172/311 |
| 4,552,375 | | 11/1985 | Kinzenbaw .......................... 172/248 |
| 4,721,168 | | 1/1988 | Kinzenbaw .......................... 172/311 |
| 4,932,197 | | 6/1990 | Allen .................................... 56/377 |
| 4,944,355 | | 7/1990 | Karchewski ........................ 172/278 |
| 4,945,997 | * | 8/1990 | Adee ............................... 172/456 X |
| 4,986,064 | | 1/1991 | Ermacora ............................. 56/228 |
| 5,024,279 | * | 6/1991 | Warner et al. .................. 172/456 X |
| 5,129,463 | | 7/1992 | Handy ................................. 172/248 |
| 5,191,942 | | 3/1993 | Bussiere ............................. 172/286 |
| 5,232,054 | * | 8/1993 | Van Blaricon et al. ......... 172/456 X |
| 5,346,019 | | 9/1994 | Kinzenbaw et al. ................ 172/311 |
| 5,488,996 | | 2/1996 | Barry et al. ........................ 172/311 |
| 5,579,849 | | 12/1996 | Houck ................................. 172/456 |
| 5,641,026 | | 6/1997 | Balmer ............................... 172/452 |
| 5,647,440 | | 7/1997 | Barry et al. ........................ 172/311 |
| 5,660,237 | | 8/1997 | Boyko et al. ....................... 172/311 |
| 5,715,893 | | 2/1998 | Houck ................................. 172/311 |
| 5,829,370 | * | 11/1998 | Bender ........................... 172/311 X |

FOREIGN PATENT DOCUMENTS

| 31 50 335 A1 | 7/1983 | (DE) . |
| 36403 | 9/1954 | (PL) . |
| 1001878 | 3/1983 | (RU) . |

OTHER PUBLICATIONS

Brochure entitled "Kinze, 2000 Series Planters", (Author unknown, cover page and pages 30–33 pp.).

* cited by examiner

*Primary Examiner*—Victor Batson
(74) *Attorney, Agent, or Firm*—Brinks Hofer Gilson & Lione

(57) ABSTRACT

A planter apparatus includes a carrier frame including a curved track portion, and a mainframe rotatably attached to the carrier frame and rotatable along the curved track portion and about a pivot point, which is offset from a centerline of the carrier frame. The transverse center of gravity of the planter apparatus is substantially along the centerline when the mainframe is in a transportation position.

33 Claims, 4 Drawing Sheets

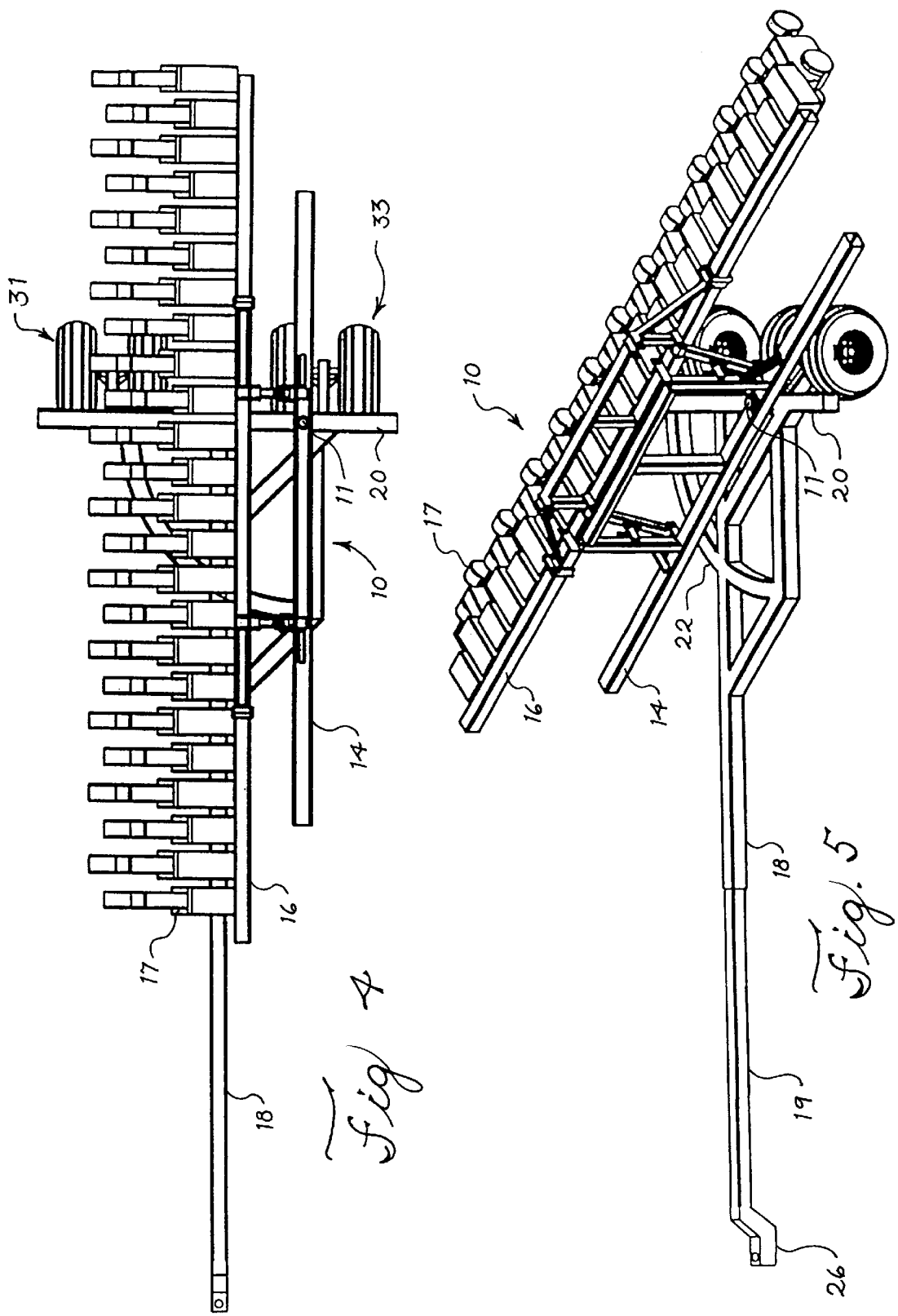

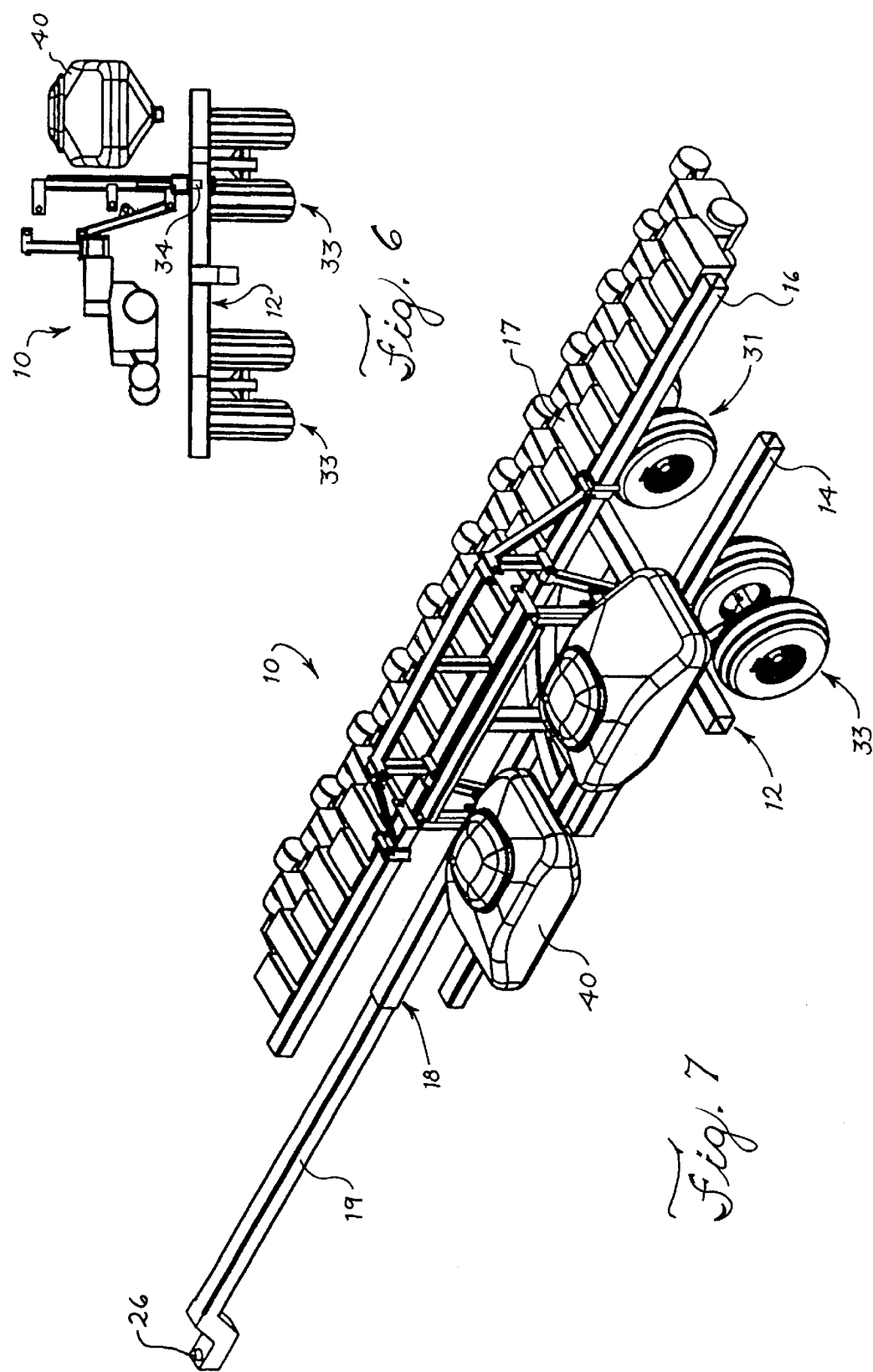

PLANTER APPARATUS AND METHOD

FIELD OF THE INVENTION

The invention generally relates to a towable implement suitable for agricultural use, and more particularly to a towable agricultural implement that is convertible between an operating position and a transportation position.

BACKGROUND OF THE INVENTION

In general, agricultural implements are used for a variety of agricultural uses, including, for example, seeding, fertilizing and tilling. Typically, these implements extend as far as laterally possible to cover the maximum amount of acreage in the minimum amount of time. With the development of modern high-powered tractors, implements, for example row crop planters, may extend to field widths of 40-feet or more in the operating position.

Problems arise when these implements are transported to and from the field due to their width. Attempts have been made to overcome these problems by making these implements more convenient to transport. Typically, the implement will be divided up into individual sections that are disconnected or folded prior to transport. Some implements require separate trailers for transportation or have cumbersome systems for reconfiguring the implement before and after transport.

These implements are not only complex and therefore expensive to manufacture, but also have other disadvantages including instability during transportation, improper balancing on the support wheels of the implement, and increased stress and wear on the implement.

It would accordingly be desirable to have an agricultural implement which is easy to manufacture and provides an efficient means for rotating the implement between an operating position and transportation position.

SUMMARY OF THE INVENTION

One aspect of the invention provides a planter apparatus comprising a carrier frame including a curved track and a centerline which runs parallel to a direction of travel, and a mainframe rotatably attached to the carrier frame to allow the mainframe to rotate along the curved track of the carrier frame and about a pivot point offset from the centerline. The carrier frame may include a T-shaped portion with the curved track attached to the T-shaped portion. A pivot opening may be formed in the carrier frame at the pivot point, and a pin may be received in the pivot opening to pivotably attach the mainframe to the carrier frame. A sub-bar assembly may be attached to the mainframe, and a plurality of ground engaging tools attached to the sub-bar assembly. Input storage units may also be attached to the mainframe. The mainframe preferably rotates between an operating position and a transportation position. The rotation may be, for example, about 90 degrees. The carrier frame preferably includes a plurality of wheels rotatably attached thereto. The transverse center of gravity of the planter apparatus is substantially along the centerline when the mainframe is in the transportation position. Preferably, the carrier frame includes a crossbar and a draw bar attached to the midpoint of the crossbar to form a T-shape, and the centerline runs along the draw bar. The pivot opening is preferably formed in the crossbar and spaced apart from the centerline. The transverse center of gravity of the planter apparatus is substantially along the centerline when the mainframe is parallel to the draw bar.

A further aspect of the invention provides a method of operating a planter apparatus. A carrier frame including a curved track and a centerline which runs parallel to the direction of travel, and a mainframe rotatably attached to the carrier frame are provided. The mainframe moves along the curved track of the carrier frame while it rotates about a pivot point offset from the centerline. The mainframe rotates between an operating position and a transportation position. The transverse center of gravity of the planter apparatus is substantially along the centerline when the planter apparatus is in the transportation position.

A further aspect of the invention provides a planter apparatus comprising a carrier frame including a T-shaped portion which includes a crossbar portion and a draw bar portion, a centerline running along the draw bar portion, a pivot opening formed in the crossbar portion and spaced apart from the centerline, and a mainframe including a pin received in the pivot opening and pivotably attaching the mainframe to the crossbar. The mainframe is pivotable between an operating position where the mainframe is parallel to the crossbar portion, and a transportation position where the mainframe is parallel to the draw bar portion. The transverse center of gravity of the planter apparatus when in the transportation position is substantially along the centerline. The mainframe may further contact with a curved track portion as it is rotated between the operation position and the transportation position. A subbar assembly is attached to and preferably oriented parallel to the mainframe. The mainframe preferably includes an opening aligned with the pivot opening to allow a pin to be inserted through the mainframe opening and the pivot opening. The weight of the mainframe may preferably be distributed at about 60% on a first side of the centerline and about 40% on a second side of the centerline when in the transportation position.

A further aspect of the invention provides a method of operating a planter apparatus. A carrier frame including a T-shaped portion which includes a crossbar portion and a draw bar portion, a centerline running along the draw bar portion, a pivot opening formed in the crossbar portion and spaced apart from the centerline, and a mainframe including a pin received in the pivot opening and pivotably attaching the mainframe to the crossbar are provided. The mainframe is pivoted between the operating position and a transportation position. A transverse center of gravity of the planter apparatus aligns substantially along the centerline when in the transportation position.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a plan view of the embodiment of FIG. 1 in a transportation position;

FIG. 5 is a perspective view of the embodiment of FIG. 1 in an intermediate position;

FIG. 6 is a sectional end view of the embodiment of FIG. 7 in the transportation position; and FIG. 7 is a perspective view of a preferred embodiment of the planter apparatus including input storage units.

DETAILED DESCRIPTION OF THE PRESENTLY PREFERRED EMBODIMENT

Figure 1:
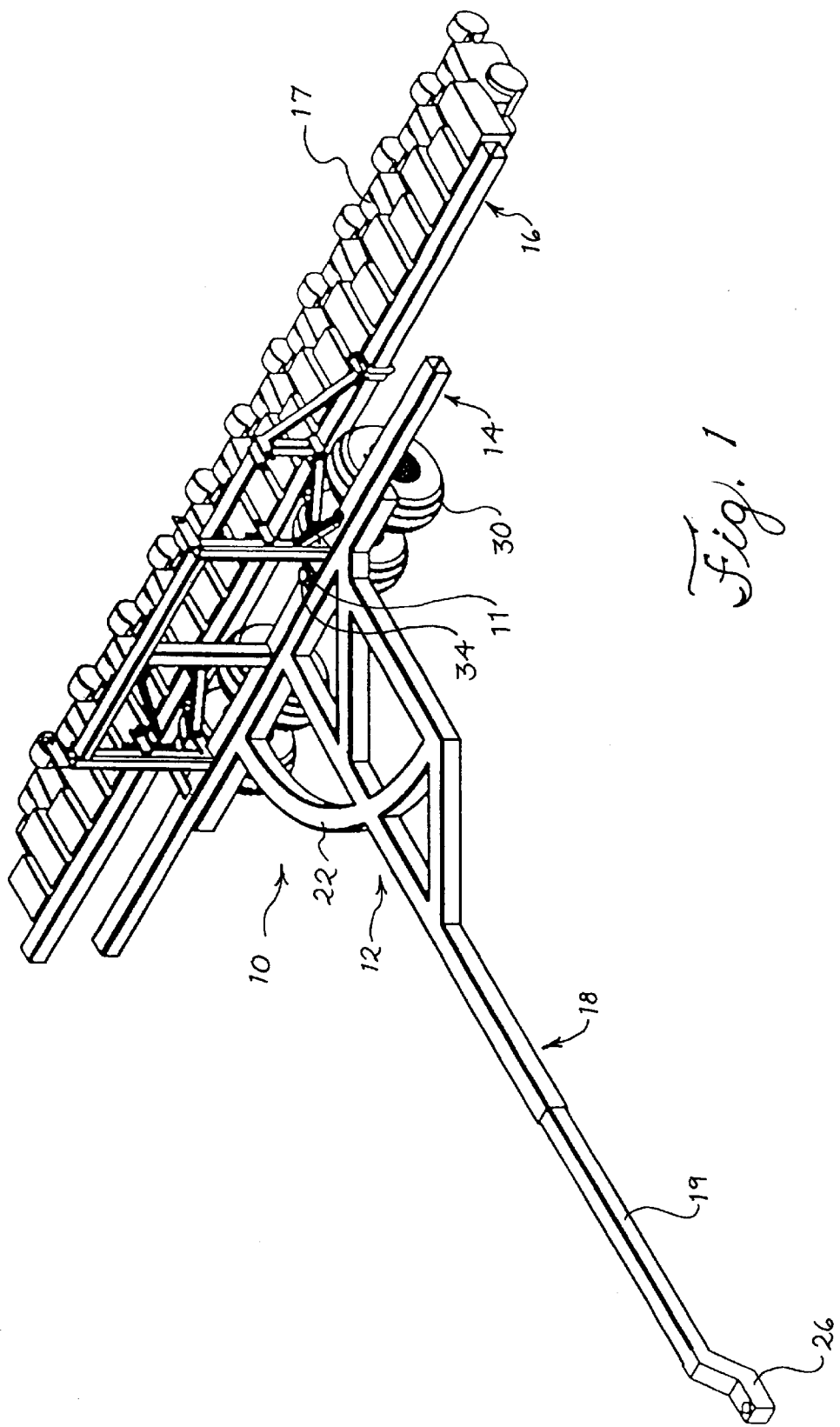
FIG. 1 is a perspective view of a preferred embodiment of a planter apparatus made in accordance with the invention.

Referring to FIG. 1, a preferred embodiment of a planter apparatus is generally shown at 10. The planter apparatus 10 may be any agricultural implement. The planter apparatus 10 comprises a carrier frame 12, a mainframe 14, and a sub-bar assembly 16. A plurality of ground engaging units 17 are attached to the sub-bar assembly 16.

Figure 2:
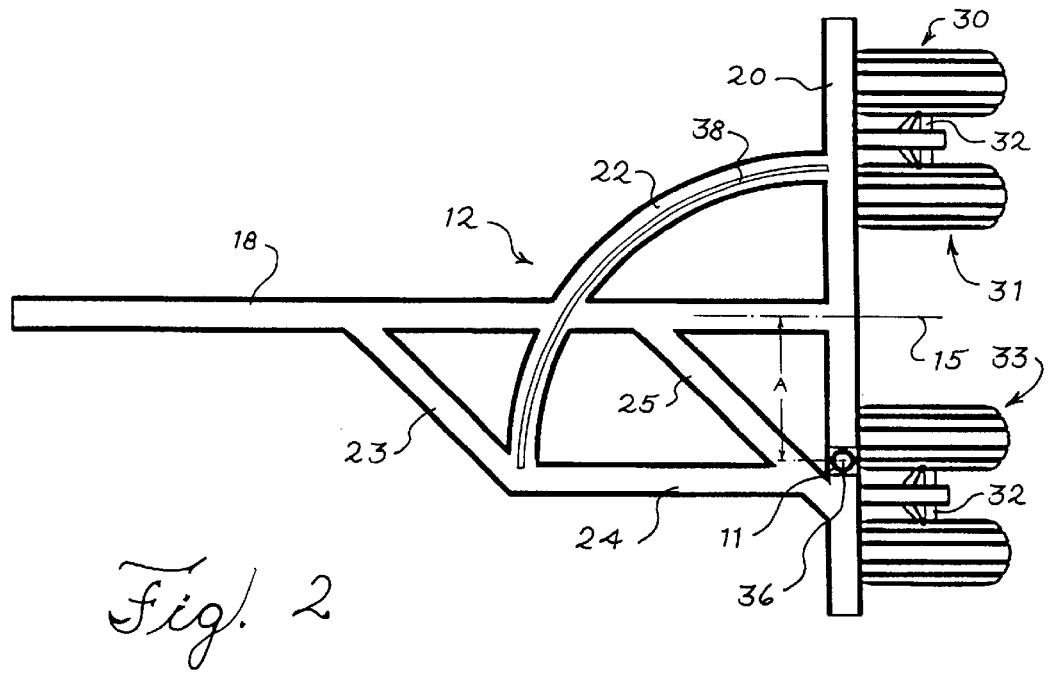
FIG. 2 is a plan view of the carrier frame of the embodiment of FIG. 1.

As shown in FIG. 2, the carrier frame 12 includes a draw bar 18, crossbar 20 and track bar 22. Preferably, brace bars 23, 24, 25 are included on the carrier frame 12 to provide added rigidity. The carrier frame 12 is preferably made of steel, but may be made from other rigid and durable materials, and may be formed as an integral member. As shown in FIG. 1, the draw bar 18 includes an attachment end 26 for connecting to a tractor or other motorized vehicle. The draw bar 18 may include a hydraulically controlled telescoping tongue 19 which may preferably be retracted during the planting operation and extended during the transportation operation. The draw bar 18 is preferably attached at a mid-point of the crossbar 20 to form a T-shape. The track bar 22 preferably has a curved shape to conform to the arcuate path of the mainframe 14 as it rotates about offset pivot point 11.

Referring to FIG. 2, the carrier frame 12 includes a plurality of wheels 30 rotatably attached via an axle 32. In the embodiment shown, there are two wheel pairs 31, 33 on separate axles 32. The wheels 30 are sized to provide sufficient support for a fully loaded planter apparatus 10. An additional wheel may be further attached to an axle extension bolted on each end of the axles 32 to provide additional stability if necessary.

Figure 3:
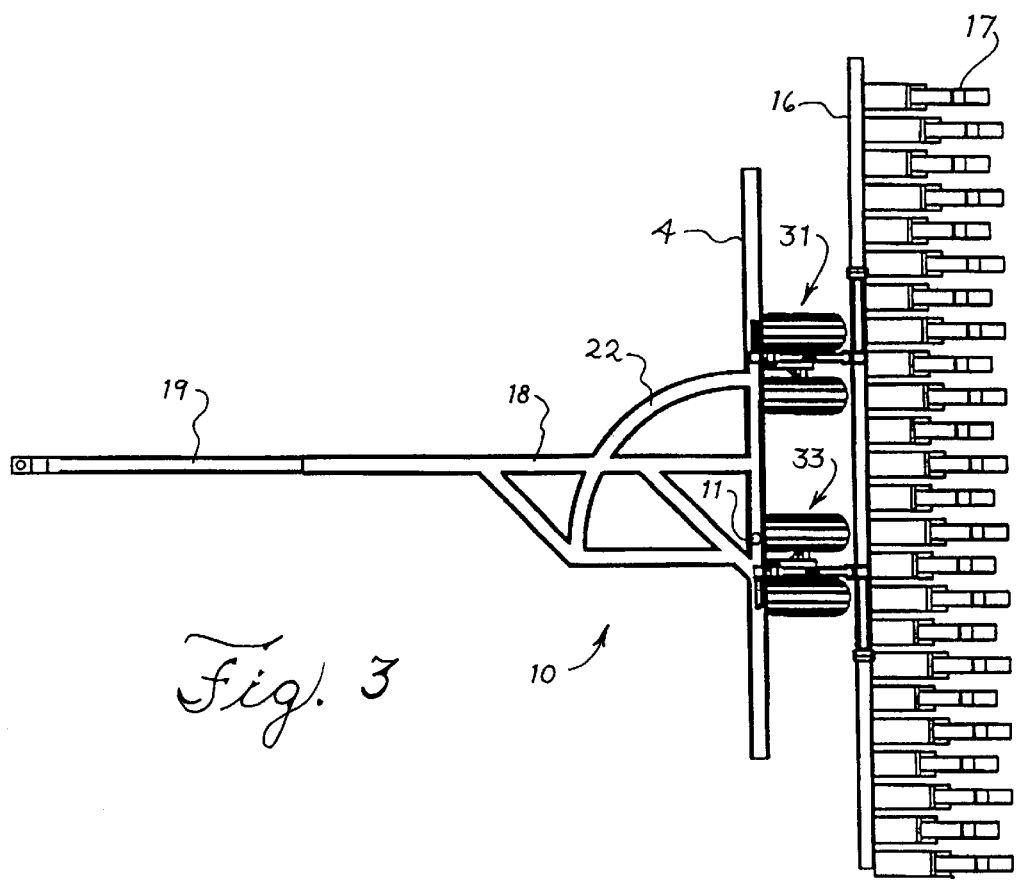
FIG. 3 is a plan view of the embodiment of FIG. 1 in an operation position.

As shown in FIGS. 1, 2 and 6, the mainframe 14 includes a pin 34, which is received in a pivot opening 36 formed in the carrier frame 12. Preferably, the mainframe 14 includes an opening which aligns with the pivot opening 36, and the pin 34 is inserted through the mainframe opening and into the pivot opening 36. In the embodiment shown, the pivot opening 36 is formed in the crossbar 20 and offset and spaced apart from a centerline 15 (shown in dotted line in FIG. 2) which runs parallel to the direction of travel of the planter apparatus as it is towed. In the embodiment shown, the centerline 15 runs along the draw bar 18. The offset distance A is shown in FIG. 2. In the embodiment shown, the positioning of the pivot opening 36 sets the pivot point 11 about which the mainframe 14 (with attached sub-bar assembly 16) rotates on the carrier frame 12. As shown in FIGS. 3–5, the mainframe 14 includes conventional linkage members and hydraulic controls to position the ground engaging tools 17 which are attached to the sub-bar assembly 16 in a down position during operation or an up position during transport. The ground engaging tools 17 include, for example, planter row units, fertilizer openers, and granular chemical distribution systems. When the mainframe 14 is rotated between the operating and transportation positions, the sub-bar assembly 16 remains parallel to the mainframe 14. Although shown as a single bar, the sub-bar assembly 16 may preferably be made up of a plurality of bars welded or mounted together to the desired field width, for example, in the embodiment shown, 30 or 40 feet.

Referring to FIG. 2, the track bar 22 preferably includes a track runner 38 formed on an upper surface of the track bar 22. The track runner 38 is preferably made of a durable material, including, for example, nylon. The mainframe 14 rides along the track runner 38 when rotated. A bottom portion of the mainframe 14 preferably slidably engages with the track runner 38 and may be rotated between the operating position, as shown in FIG. 3, and the transportation position, as shown in FIG. 4. The track bar 22 aids in stabilizing the planter apparatus 10 during rotation of the mainframe 14 between the transportation and operating positions.

The offset distance A of the pivot point 11 allows the transverse center of gravity of the mainframe 14 and its accompanying load, including the sub-bar assembly 16, ground engaging tools 17 and input storage units 40 (shown in FIGS. 6 and 7), to be substantially along the centerline 15 when the planter apparatus is in the transportation position (shown in FIG. 4). The transverse center of gravity of the planter apparatus 10 is accordingly generally along the centerline 15 to provide stability. Offsetting the pivot point 11 also forces the center of gravity forward, toward the tractor during transport and provides additional stability. Although the pivot point 11 is shown on a right side of the centerline 15, it may alternatively and preferably be on the left side of the centerline 15 to provide more visibility during transport.

The offset positioning of the pivot point 11 may preferably be determined by locating a balance position of the planter apparatus 10 when in the transportation position. The balance position is located when there is an equal distribution on each of the wheel pairs 31, 33, or where the center of gravity is along the draw bar 18 and/or centerline 15 of the carrier frame 12, in the embodiment shown. The balance position, however, changes with the weight of, for example, seed, fertilizer, and/or chemicals in the input storage units 40. The input storage units 40 may include grain bins, seed hoppers and other fertilizer and chemical storage units. Normally, the planter apparatus 10 is in a transportation position prior to planting, when the mainframe 14 is fully loaded with seed, fertilizer, and/or chemicals. In addition, the planter apparatus 10 is in the transportation position upon completion of the planting operation, when the grain bins and other input storage units are empty.

By first determining a fully loaded balance position and an empty balance position for a given sized sub-bar assembly 16, an optimal pivot point location may be determined. For example, in a preferred embodiment, the offset distance A is 36 inches. This distance was found optimal for an embodiment shown which operates with 30 or 40-foot sub-bars. This offset distance was determined by first determining the fully loaded and empty balance positions for the 30-foot-long sub-bar. The fully loaded and empty balance positions were next determined for the 40-foot-long sub-bar. In the embodiment shown, the fully loaded weight used for determining the fully loaded balance position included, for example, the mainframe 14, sub-bar assembly 16, planter units and storage bins with a full load of seed, fertilizer openers and granular chemical distribution systems. The empty balance position was determined using only the weight of the mainframe, sub-bar, and empty planter units for both the 30-foot and 40-foot sub-bars. The midpoint of both the 30-foot and 40-foot sub-bars were then calculated using the fully loaded and empty conditions, as explained above. Then these two midpoints were averaged to determine the offset length A, which locates the position of the optimal pivot opening, and accordingly the optional pivot point. For example, using this optional pivot point when in the transportation position with the fully loaded weight, weight is distributed with approximately 60% of the weight on wheel pair 31 and approximately 40% of the weight on wheel pair 33. When using the empty conditions described above, the weight is distributed approximately 40% on wheel pair 31 and approximately 60% on wheel pair 33. Thus, in both the fully loaded and empty conditions, the center of gravity of the planter apparatus 10 is substantially along the centerline 15.

Referring to FIGS. 3–6, the planter apparatus 10 is positioned in a transportation position by raising the hydraulically controlled ground engaging tools 17 to a raised position. The hydraulically driven mainframe 14 is then rotated from the operating position (shown in FIG. 3) about the offset pivot point 11 to the transportation position (shown in FIG. 4). Preferably a locking mechanism allows the mainframe 14 to be locked into position when in the transportation and operating position. The mainframe 14 rides along the track runner 38 of the track bar 22. The mainframe 14 may preferably, for example, remain in contact with the track runner 38 by gravity force. Other guide rails with clamps or other conventional track guides may alternatively also be used. In the embodiment shown, the mainframe 14 includes a pin 34 which is received in pivot opening 36 to establish the pivot point 11. Alternatively, the mainframe 14 may be movably attached to the track runner 38 in a manner which automatically establishes the pivot point 11 at the desired offset position.

Referring to FIG. 6, through use of the offset pivot point, the mainframe and accompanying load may be distributed to the wheel pairs 31, 33 in a manner which will allow safe transportation under a fully loaded condition and an empty weight condition.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A planter apparatus comprising:
    a carrier frame including a centerline running substantially parallel to a direction of travel and a support surface defining a curved track extending across the centerline of the carrier frame; and
    a mainframe rotatably attached to the carrier frame to allow the mainframe to rotate along the curved track on the support surface of the carrier frame and about pivot point offset from the centerline between an operating position and a transportation position.

2. The apparatus of claim 1 further comprising a sub-bar assembly attached to the mainframe.

3. The apparatus of claim 2 further comprising a plurality of ground engaging tools attached to the sub-bar assembly.

4. The apparatus of claim 3 further comprising at least one input storage unit attached to the mainframe.

5. The apparatus of claim 1 wherein the mainframe rotates between an operating position and a transportation position about a pivot pin provided at said pivot point.

6. The apparatus of claim 1 wherein the carrier frame includes a plurality of wheels rotatably attached thereto.

7. The apparatus of claim 1 wherein the rotation between the operating position and transportation position is approximately 90 degrees.

8. The apparatus of claim 1 wherein a transverse center of gravity of the planter apparatus when in the transportation position is substantially along the centerline.

9. The apparatus of claim 1 wherein the pivot point is offset from the centerline about thirty-six inches.

10. A planter apparatus comprising:
    a carrier frame including a T-shaped portion, the T-shaped portion including a crossbar portion and a draw bar portion, a centerline running along the draw bar portion, a pivot point formed in the cross-bar portion and spaced from the centerline, and a curved support surface provided on the carrier frame and extending across the centerline of the draw bar portion; and
    a mainframe including a portion connected to the pivot point and pivotably attaching the mainframe to the crossbar; wherein the mainframe is pivotable along the curved support surface across the centerline of the draw bar portion between an operating position where the mainframe is substantially parallel to the crossbar portion and a transportation position where the mainframe is substantially parallel to the draw bar portion, and where a transverse center of gravity of the planter apparatus when in the transportation position is substantially along the centerline.

11. The apparatus of claim 10 further comprising:
    a curved track bar portion attached to the T-shaped portion, the mainframe contacting with the curved track bar portion as it is rotated between the operation position and transportation position.

12. The apparatus of claim 10 wherein the weight of the mainframe is distributed about 60 percent on a first side of the centerline and about 40% on a second side of the centerline when in the transportation position.

13. The apparatus of claim 10 wherein the pivot point is offset from the center line about thirty-six inches.

14. A planter apparatus comprising:
    a carrier frame including a T-shaped portion having a support surface and a centerline, the centerline runs substantially parallel to a direction of travel, and a mainframe rotatably attached to the carrier frame to allow the mainframe to rotate along the support surface of the carrier frame and about a pivot point offset from the centerline approximately ninety degrees between an operating position and a transportation position.

15. The apparatus of claim 14 wherein the carrier frame includes a crossbar and a draw bar attached at a midpoint of the crossbar to form the T-shape, the centerline running along the draw bar.

16. The apparatus of claim 15 wherein a pivot is formed in the crossbar and spaced apart from the centerline.

17. The apparatus of claim 16 wherein a transverse center of gravity of the planter apparatus is substantially along the centerline when the mainframe is substantially parallel to the draw bar.

18. A planter apparatus comprising:
    a carrier frame including a curved support surface and a centerline, the centerline running substantially parallel to a direction of travel, and a mainframe rotatably attached to the carrier frame to allow the mainframe to rotate along the curved support surface of the carrier frame and about a pivot point offset from the centerline between an operating position and a transportation position, at least one storage unit and a subframe assembly attached to the main frame including a plurality of ground-engaging tools, wherein the weight of the mainframe is distributed about 60% on a first side of the centerline and 40% on a second side of the centerline when the mainframe is in the transportation position.

19. The apparatus of claim 18 wherein about 60 percent of the weight of the mainframe is distributed to one of the first and second sides when the storage unit is substantially loaded and to the other of the first and second sides when the storage unit is substantially empty.

20. A method of operating the planter apparatus comprising:
    providing a carrier frame including a centerline running parallel to a direction of travel and further including a support surface defining a curved track extending across the centerline, and a mainframe rotatably attached to the carrier frame;
    moving the mainframe along the curved track on the support surface of the carrier frame; and
    rotating the mainframe across the centerline about a pivot point offset from the centerline with a curved track providing support for the mainframe.

21. The method of claim 20 wherein the mainframe is rotated to place a transverse center of gravity of the planter apparatus substantially along the centerline when the planter apparatus is in the transportation position.

22. A planter apparatus comprising:

a carrier frame including a centerline and a curved support surface extending across the centerline, the centerline having first and second sides and running substantially parallel to the direction of travel, and a mainframe rotatably attached to the carrier frame to allow the mainframe to rotate along the support surface across the centerline of the carrier frame about a pivot point offset from the centerline between an operating position and a transport position, the weight of the mainframe distributed so that between about forty and sixty percent of the weight of the mainframe is on the first and the second sides of the centerline with the mainframe in both the operating and transportation positions.

23. The apparatus of claim 22 further comprising at least one storage unit and a sub frame assembly attached to the mainframe including a plurality of ground-engaging tools.

24. The apparatus of claim 23 wherein up to about sixty percent of the weight of the mainframe is distributed to one of the first and second sides when the storage unit is substantially loaded and to the other of the first and second sides when the storage unit is substantially empty.

25. A planter apparatus comprising:

a carrier frame including a support surface and a centerline, the centerline runs substantially parallel to a direction of travel, a mainframe rotatably attached to the carrier frame to allow the mainframe to rotate between an operating position and a transportation position along the support surface of the carrier frame and about a pivot point offset from the centerline, and an extendable drawbar attached to the carrier frame and adapted to extend when the mainframe is moved to the transportation position and retract when the mainframe is moved to the operating position.

26. The apparatus of claim 25 further comprising a hydraulic member arranged to extend and retract the drawbar.

27. A planter apparatus comprising:

a carrier frame including a curved support surface and a centerline, the centerline running substantially parallel to a direction of travel, and a mainframe rotatably attached to the carrier frame to allow the mainframe to rotate along the curved support surface of the carrier frame and about the pivot point offset from the centerline between an operating position and a transport position, and an extendable draw bar attached to the carrier frame and adapted to extend when the mainframe is moved to the transportation position and retract when the mainframe is moved to the operating position.

28. The apparatus of claim 27 further comprising a hydraulic member arranged to extend and retract the drawbar.

29. A method of operating a planter apparatus comprising:

providing a carrier frame including a centerline and a curved support surface extending across the centerline, the centerline having first and second sides and running parallel to a direction of travel, a mainframe rotatably attached to the carrier frame;

moving the mainframe along the support surface of the carrier frame; and rotating the mainframe across the centerline between an operating position and a transportation system about a pivot point offset from the centerline with the support surface providing support for the mainframe so that the rotation of the mainframe into the transport positing distributes between about forth percent and about sixty percent of the weight of the mainframe on the first and second sides of the centerline.

30. A method of operating a planter apparatus comprising:

providing a carrier frame including a support surface and a centerline, the centerline running parallel to a direction of travel, a mainframe rotatably attached to the carrier frame; and an extendable drawbar connected to the carrier frame;

moving the mainframe along the support surface of the carrier frame;

rotating the mainframe about a pivot point offset from the centerline with the support surface providing support for the mainframe; and moving the drawbar between a retracted position and an extended position as the mainframe is rotated between an operating position and a transportation position.

31. A method of operating a planter apparatus comprising:

providing a carrier frame including a curved support surface and a centerline, the centerline running parallel to a direction of travel, a mainframe rotatably attached to the carrier frame, and an extendable draw bar connected to the carrier frame;

moving the mainframe along the curved support surface of the carrier frame;

rotating the mainframe about a pivot offset from the centerline with the curved support surface providing support for the mainframe; and moving the draw bar between a retracted position and an extended position as the mainframe is rotated between the operating position and the transportation position.

32. A method of operating a planter apparatus comprising:

providing a carrier frame including a curved support surface and a centerline, the centerline running parallel to a direction of travel, a mainframe rotatably attached to the carrier frame;

moving the mainframe along the curved support surface of the carrier frame; and rotating the mainframe about a pivot point offset from the center line with the support surface providing support for the mainframe to place a transverse center of gravity of the planter apparatus substantially parallel to the centerline and distribute about 60% of the weight of the mainframe on a first side of the centerline and about 40% of the weight on a second side of the centerline when the planter apparatus is in the transportation position.

33. A method of operating the planter apparatus comprising:

providing a carrier frame including a generally T-shaped portion, the T-shaped portion including a crossbar portion and a draw bar portion, a centerline running along the draw bar portion, a pivot point formed on the crossbar portion and spaced apart from the centerline, a curved support surface extending across the centerline, and a mainframe pivotably attached to the crossbar at the pivot point;

pivoting the mainframe along the curved support surface and across the centerline from an operating position to a transportation; and aligning the transverse center of gravity of the planter apparatus substantially along the centerline when in the transportation position.

* * * * *

UNITED STATES PATENT AND TRADEMARK OFFICE
CERTIFICATE OF CORRECTION

PATENT NO. : 6,213,034 B1
DATED : April 10, 2001
INVENTOR(S) : Kregg J. Raducha et al.

Page 1 of 1

It is certified that error appears in the above-identified patent and that said Letters Patent is hereby corrected as shown below:

Claim 12,
Line 2, delete "60 percent" and substitute -- 60% -- in its place.

Claim 29,
Line 13, delete "positing" and substitute -- position -- in its place.
Line 14, delete "forth" and substitute -- forty -- in its place.

Signed and Sealed this

Ninth Day of April, 2002

Attest:

Attesting Officer

JAMES E. ROGAN
Director of the United States Patent and Trademark Office